US011032450B2

(12) United States Patent
Lim et al.

(10) Patent No.: US 11,032,450 B2
(45) Date of Patent: *Jun. 8, 2021

(54) CAMERA MODULE MOUNTING IN AN ELECTRONIC DEVICE

(71) Applicant: Google LLC, Mountain View, CA (US)

(72) Inventors: David Kyungtag Lim, Clenview, IL (US); Jason Edward Jordan, Burlingame, CA (US)

(73) Assignee: Google LLC, Mountain View, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 16/406,438

(22) Filed: May 8, 2019

(65) Prior Publication Data
US 2019/0268513 A1    Aug. 29, 2019

Related U.S. Application Data

(63) Continuation of application No. 15/429,233, filed on Feb. 10, 2017, now Pat. No. 10,306,114.

(51) Int. Cl.
H04N 5/225        (2006.01)
H04M 1/02         (2006.01)
H04N 5/232        (2006.01)

(52) U.S. Cl.
CPC ........ H04N 5/2251 (2013.01); H04M 1/0264 (2013.01); H04N 5/2252 (2013.01); H04N 5/2253 (2013.01); H04N 5/2254 (2013.01); H04N 5/2257 (2013.01); H04N 5/23293 (2013.01)

(58) Field of Classification Search
CPC .. H04N 5/225; H04N 5/2252; H04N 5/23293; H04N 5/2253; H04N 5/2254; G02F 1/133308; H04M 1/0264; Y10T 29/49895
USPC ......................................................... 348/376
See application file for complete search history.

(56) References Cited

U.S. PATENT DOCUMENTS 7,054,073 B2 *  5/2006  Shirie .................. G02B 7/08
                                                353/100
7,133,222 B2 * 11/2006  Chintala .............. G02B 7/02
                                                359/811
7,880,796 B2 *  2/2011  Yamaguchi ....... H01L 31/02325
                                                348/335

(Continued)

FOREIGN PATENT DOCUMENTS

CN        204598119 U      8/2015
WO     WO 2017/171498     10/2017

OTHER PUBLICATIONS

International Preliminary Report on Patentability in International Application No. PCT/US2017/058556, dated Aug. 13, 2019, 9 pages.

(Continued)

Primary Examiner — Pritham D Prabhakher
(74) Attorney, Agent, or Firm — Fish & Richardson P.C.

(57) ABSTRACT

An electronic device including a camera module is provided. In some embodiments, the electronic device includes a display device, a housing including an outer cover, and a camera module including an image sensor, a camera module circuit board, and an optical element. The outer cover defines a cavity, and the camera module is positioned at least partially within the cavity.

21 Claims, 5 Drawing Sheets

(56) References Cited

U.S. PATENT DOCUMENTS

| | | | |
|---|---|---|---|
| 8,421,913 B2* | 4/2013 | Kim | H04N 5/2257 348/376 |
| 8,670,068 B2* | 3/2014 | Hsiung | G03B 11/043 348/374 |
| 8,886,031 B2* | 11/2014 | Pope | G03B 17/02 396/535 |
| 9,055,206 B1* | 6/2015 | Chuang | H04N 5/2252 |
| 9,241,097 B1 | 1/2016 | Tam | |
| 9,462,165 B2 | 10/2016 | Moon | |
| 10,126,781 B2* | 11/2018 | Ahn | G06F 1/1605 |
| 10,306,114 B2 | 5/2019 | Lim et al. | |
| 2005/0237418 A1* | 10/2005 | Sakamoto | H01L 27/14618 348/340 |
| 2007/0052050 A1 | 3/2007 | Dierickx | |
| 2008/0205873 A1* | 8/2008 | Park | G03B 11/06 396/200 |
| 2009/0161215 A1* | 6/2009 | Chan | G03B 17/00 359/511 |
| 2011/0050986 A1 | 3/2011 | Wang | |
| 2011/0228154 A1 | 9/2011 | Westerweck et al. | |
| 2011/0255000 A1 | 10/2011 | Weber et al. | |
| 2013/0051785 A1 | 2/2013 | Pope | |
| 2013/0076965 A1 | 3/2013 | Dabov | |
| 2013/0128106 A1* | 5/2013 | Tam | H04N 5/2254 348/374 |
| 2013/0258165 A1 | 10/2013 | Lipson et al. | |
| 2013/0270419 A1 | 10/2013 | Singh | |
| 2013/0308048 A1* | 11/2013 | Park | H04N 5/2254 348/374 |
| 2014/0043320 A1 | 2/2014 | Tosaya et al. | |
| 2014/0043525 A1 | 2/2014 | Azuma et al. | |
| 2014/0176779 A1 | 6/2014 | Weber | |
| 2014/0184521 A1* | 7/2014 | Kwong | G03B 17/12 345/173 |
| 2014/0253799 A1 | 9/2014 | Moon et al. | |
| 2015/0138434 A1 | 5/2015 | Chuang et al. | |
| 2016/0212311 A1 | 7/2016 | Matthew et al. | |
| 2017/0068287 A1* | 3/2017 | Jung | G06F 1/1637 |
| 2017/0195530 A1* | 7/2017 | Chen | G02B 9/60 |
| 2017/0195563 A1 | 7/2017 | Ribeiro | |
| 2017/0373376 A1 | 12/2017 | Jo | |
| 2018/0234594 A1 | 8/2018 | Lim et al. | |
| 2018/0234595 A1* | 8/2018 | Lim | H04N 5/2252 |

OTHER PUBLICATIONS

International Search Report and Written Opinion issued in International Application No. PCT/US2017/058556, dated on Jan. 31, 2018, 19 pages.

\* cited by examiner

CAMERA MODULE MOUNTING IN AN ELECTRONIC DEVICE

CROSS-REFERENCE TO RELATED APPLICATION

This application is a continuation of U.S. application Ser. No. 15/429,233, filed Feb. 10, 2017, the contents of which are incorporated by reference herein.

BACKGROUND

Camera modules designed to be included in an electronic device are well known. Many electronic devices, such as mobile phones and digital cameras, include one or more camera modules configured to capture images and video. Such camera modules often include a housing or frame, a plurality of lenses, a circuit board, and an image sensor mounted with the circuit board. The camera module is often housed within an electronic device and electrically connected to other components of the electronic device. Various configurations of electronic devices designed to reduce the space required to accommodate a camera module have been proposed.

SUMMARY

In general, this document describes devices, systems, and methods related to camera modules in electronic devices. Some electronic devices described herein may include an outer cover having features configured to accommodate a camera module in a space-efficient arrangement. The outer cover may include a camera module aperture defining a cavity, such that the camera module may be positioned at least partially within the cavity. The overall thickness of the electronic device may thus be reduced and/or the optical quality of the camera module improved.

As additional description to the embodiments described below, the present disclosure describes the following embodiments.

Embodiment 1 is an electronic device, comprising: a display device; a housing including an outer cover, the outer cover defining a cavity; and a camera module including an image sensor, a circuit board, and a first optical element, wherein: the camera module is positioned at least partially within the cavity defined by the outer cover.

Embodiment 2 is the electronic device of embodiment 1, wherein a portion of the outer cover positioned over the display device has a first thickness, the first thickness being between 0.4 mm and 1.5 mm.

Embodiment 3 is the electronic device of any of the preceding embodiments, wherein the cavity defined by the outer cover has a second thickness, the second thickness being between 25% and 80% of the first thickness.

Embodiment 4 is the electronic device of any of the preceding embodiments, wherein the camera module includes a lens barrel that includes a second optical element, a third optical element, and a fourth optical element.

Embodiment 5 is the electronic device of any of the preceding embodiments, wherein the lens barrel is positioned at least partially within the cavity such that the lens barrel is at least partially surrounded by the outer cover.

Embodiment 6 is the electronic device of any of the preceding embodiments, further comprising a seal in sealing engagement between the camera module and the outer cover.

Embodiment 7 is the electronic device of any of the preceding embodiments, wherein the seal is in sealing engagement with an inner side of the outer cover and a shoulder of the camera module.

Embodiment 8 is the electronic device of any of the preceding embodiments, wherein the cavity is defined by a through-hole through the outer cover.

Embodiment 9 is the electronic device of any of the preceding embodiments, further comprising a cover lens providing an outermost lens of the camera module, the cover lens having an outer surface positioned coplanar with an outer surface of the outer cover, the cover lens attached to the outer cover.

Embodiment 10 is the electronic device of any of the preceding embodiments, wherein the camera module is mounted to a circuit board within the housing, and is not directly connected with the cover lens.

Embodiment 11 is the electronic device of any of the preceding embodiments, wherein the camera module comprises a voice coil motor and at least one optical element movable relative to the image sensor by actuation of the voice coil motor.

Embodiment 12 is the electronic device of any of the preceding embodiments, wherein the camera module is mounted to an inner side of the outer cover.

Embodiment 13 is the electronic device of any of the preceding embodiments, further comprising a circuit board, a processor and speaker mounted to the circuit board.

Embodiment 14 is the electronic device of embodiment 13, wherein the camera module is mounted to the circuit board.

Embodiment 15 is an electronic device, comprising: a display device; a housing including an outer cover, the outer cover having a first thickness between 0.4 mm and 1.5 mm over the display device, the outer cover having a second thickness between 25% and 80% of the first thickness at a location of a cavity; and a camera module including an image sensor, a camera module circuit board, and a lens barrel including at least a first optical element; wherein the lens barrel of the camera module is positioned at least partially within the cavity defined by the outer cover such that the lens barrel is at least partially surrounded by the outer cover.

Embodiment 16 is the electronic device of embodiment 15, wherein the camera module is mounted to an inner side of the outer cover.

Embodiment 17 is the electronic device of embodiment 15 or 16, wherein the camera module has a front end having a front end diameter and a shoulder having a shoulder diameter, the shoulder diameter larger than the front end diameter, and the cavity defined by the outer cover has a diameter greater than the front end diameter and less than the shoulder diameter.

Embodiment 18 is the electronic device of embodiment 17, wherein the shoulder of the camera module is attached to the outer cover.

Embodiment 19 is a method of mounting a camera module, comprising: defining a cavity in an outer cover of an electronic device; positioning a front end of a camera module at least partially within the cavity; and enclosing the camera module within an electronic device housing.

Embodiment 20 is the method of embodiment 19, further comprising positioning a cover lens in alignment with the camera module and coplanar with an outer surface of the outer cover.

These and other embodiments of the disclosed technology described herein may provide one or more of the following benefits. First, some configurations described herein allow an electronic device to be smaller. Positioning a camera module at least partially within a cavity in an outer cover can reduce the overall thickness of the electronic device because the outer cover and camera module at least partially overlap. The camera module may thus occupy less space below an inner side of the outer cover.

Second, some configurations described herein can provide flexibility in arranging and assembling a camera module and other components within the electronic device. For example, in some embodiments, a camera module can be mounted to the outer cover before assembly with other components of the electronic device.

Third, some configurations described herein can improve the quality of images and video captured by the camera module. By reducing the space required within the electronic device to accommodate the camera module (e.g., by at least partially accommodating the camera module within a cavity of the outer cover), larger or additional optical elements or other components may be included in the camera module to improve image quality without increasing the overall size of the electronic device.

Details of one or more embodiments are set forth in the accompanying drawings and the description below. Other features and advantages will be apparent from the description and drawings, and from the claims.

DESCRIPTION OF THE DRAWINGS

The details of one or more embodiments are set forth in the accompanying drawings and the description below, and wherein.

DETAILED DESCRIPTION OF ILLUSTRATIVE EMBODIMENTS

Figure 1:
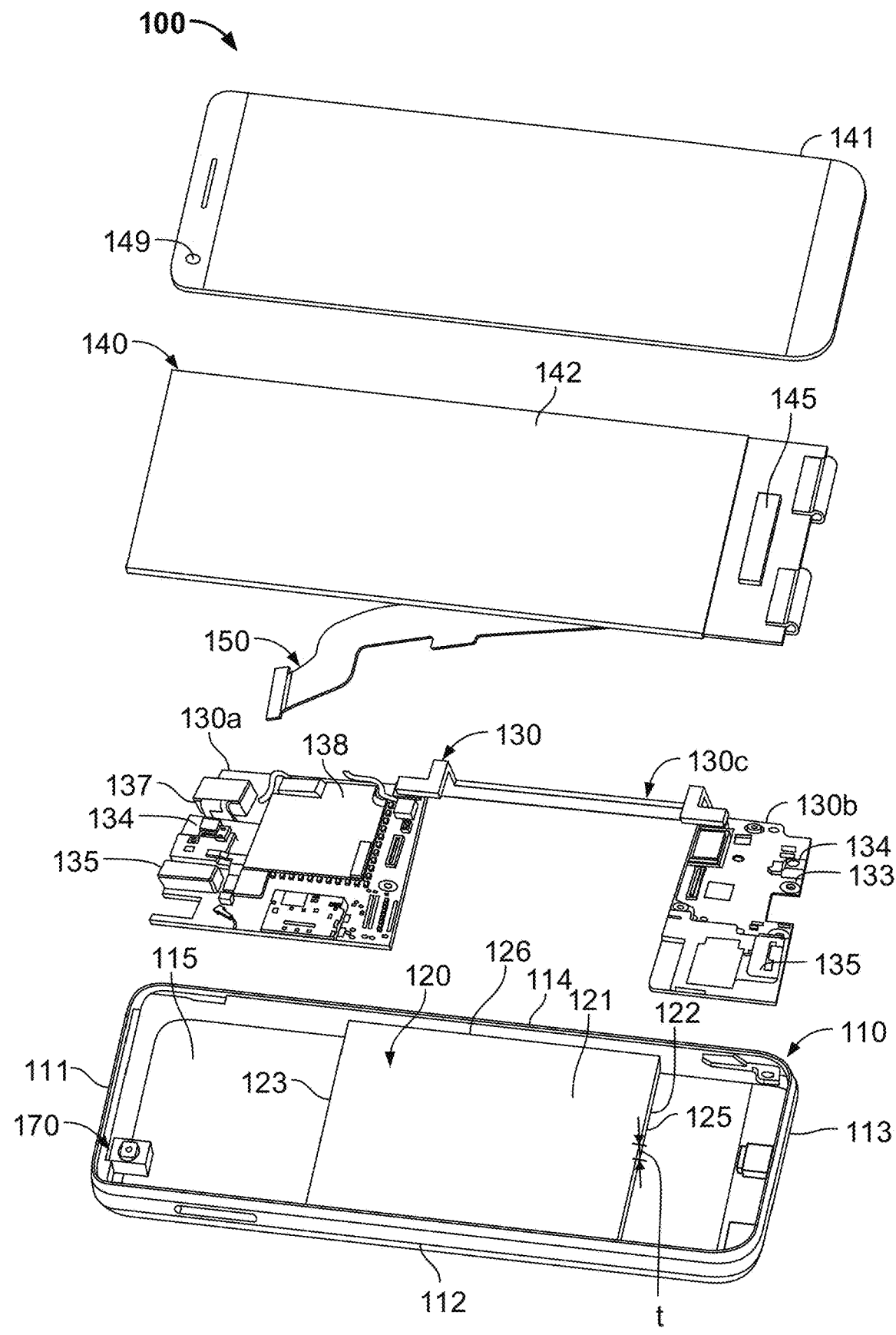
FIG. 1 is a perspective exploded view of an example electronic device having a camera module.

Referring to FIG. 1, an example electronic device 100 is shown, including an electronic device housing 110, battery 120, circuit board 130, display assembly 140, and camera module 170. Camera module 170 is configured to capture high-quality images and video while occupying a relatively small volume within electronic device housing 110. In some embodiments, camera module 170 is at least partially positioned within a cavity defined by an outer housing of electronic device 100.

Electronic device 100 may be an electronic device that includes a camera module, such as a mobile phone, music player, tablet, laptop computing device, wearable electronic device, data storage device, display device, adapter device, desktop computer, digital camera, or other electronic device.

Electronic device housing 110 may be a bucket-type enclosure having first, second, third, and fourth side portions 111, 112, 113, 114 that define outer sidewalls of electronic device 100, and a back major planar face 115 integrally attached with side portions 111, 112, 113, 114. A bucket-type enclosure allows components of electronic device 100 to be accommodated within housing 110 and enclosed by an outer cover, such as outer cover 141. In other embodiments, one or more side portions 111, 112, 113, 114, and/or back major planar face 115 may be formed separately and subsequently joined together (e.g., with one or more adhesives, welds, snap-fit connectors, fasteners, etc.) to form electronic device housing 110. In various embodiments, electronic device housing 110 may be an H-beam type housing or other electronic device housing 110 that includes one or more walls that provide a housing to at least partially support and/or enclose components of electronic device 100.

Electronic device housing 110 is made from a material that provides adequate structural rigidity to support and protect internal components of electronic device 100. In some embodiments, electronic device housing 110 is formed from a single piece of metal. Electronic device housing 110 may be milled, molded, forged, etched, printed, or otherwise formed. Alternatively or additionally, electronic device housing 110 may be formed from plastic, glass, wood, carbon fiber, ceramic, combinations thereof, and/or other materials.

Electronic device housing 110 and an outer cover 141 define an interior volume that can house various components of electronic device 110, including battery 120, circuit board 130, display assembly 140, and camera module 170. Electronic device housing 110 can accommodate additional components of electronic device 100, such as microphone 133, speaker 134, sensors 135, such as fingerprint sensors, proximity sensors, accelerometers, and/or other sensors, flash devices 137, processor 138, antennas, and/or other components. In various embodiments, some or all of these components may be electrically connected with circuit board 130.

Display assembly 140 provides a user interface display that displays information to a user. For example, display assembly 140 may provide a touch screen display that a user can interact with to view displayed information and to provide input to electronic device 100. In some embodiments, display assembly 140 occupies substantially all or the majority of a front major face 116 of electronic device 100 (e.g., and covers battery 120 and first, second, and third circuit boards 130a, 130b, 130c), and includes a rectangular visible display.

Display assembly 140 includes one or more substrate layers that provide the visible display and/or allow display assembly 140 to receive touch input from a user. For example, outer cover 141 may serve as an outermost layer that encloses other components of display assembly 140 and electronic device 100 and that a user may physically touch to provide input to electronic device 100. In some embodiments, display assembly 140 includes a liquid crystal display (LCD) panel 142 including a liquid crystal material positioned between one or more color-filter and thin-film-transistor (TFT) layers. The layers of display panel 142 may include substrates formed from glass or polymer, such as polyamide. In various embodiments, display assembly 140 may be a light-emitting diode (LED) display, an organic light-emitting diode (OLED) display, such as an active-matrix organic light-emitting diode (AMOLED) display, a plasma display, an electronic ink display, or other display that provides visual output to a user.

Display assembly 140 includes driver circuitry used to control display output and/or receive user input. In some embodiments, driver circuitry includes a display integrated circuit 145 that is mounted in electrical communication with the TFT layers of display panel 142, for example by gate lines or other electrical connection. Display integrated circuit 145 may receive display data from processor 138, for example, and deliver corresponding signals to control the optical properties of a liquid crystal layer, for example, to produce a visible output.

Connection between display integrated circuit 145 and circuit board 130 (and processor 138, for example) may be provided by an electrical conductor that facilitates a robust electrical connection while maintaining a low profile configuration that does not significantly increase the overall dimensions of electronic device 100. In some embodiments, a flex conductor 150 connects display integrated circuit 145 and circuit board 130. Flex conductor 150 includes conductive structures on a thin, flexible substrate. Flex conductor 150 has a relatively thin profile and may be bent along a longitudinal direction to fit between various components of electronic device 100, such as to connect from a front face of a display substrate to circuit board 130 by passing between battery 120 and a rear of display assembly 140. Flex conductor 150 may be connected between first circuit board 130a (e.g., a top circuit board) or second circuit board 130b (e.g., a bottom circuit board). Alternatively or additionally, further electrical communication between display assembly 140 and the other of first circuit board 130a or second circuit board 130b is provided via third circuit board 130c.

Components of display assembly 140 and flex conductor 150 may be positioned within electronic device 100 such that the space required to connect display assembly 140 with circuit board 130 is reduced. In some embodiments, display integrated circuit 145 may be positioned at a bottom of display substrate 142 (e.g., a portion of display substrate 142 close to bottom wall 113) and flex conductor 150 wraps around a back side of display substrate 142 to connect with first and/or second circuit boards 130a, 130b. In some embodiments, display integrated circuit 145 may be positioned at a top of display substrate 142 (e.g., a portion of display substrate 142 close to top wall 111) and flex conductor 150 wraps around a back side of display substrate 142 to connect with first and/or second circuit boards 130a, 130b. In some embodiments, display integrated circuit 145 may be positioned along a side of display substrate 142 (e.g., a side portion of display substrate 142 close to sidewall 112 or sidewall 114) and flex conductor wraps around a back side of display substrate 142 to connect with first and/or second circuit boards 1301, 130b. In some embodiments, display integrated circuit 145 and flex conductor 150 are positioned so that flex conductor 150 does not extend between display assembly 140 and battery 120. Positioning the battery 120 directly adjacent display assembly 140 (e.g., without an intervening electrical conductor 150 passing between battery 120 and display assembly 140) facilitates an increased battery size having a greater power capacity.

Conductive structures of flex conductor 150 may include conductive lines, printed conductive traces, or other conductive components that provide electrical connection between respective electrical contacts associated with display integrated circuit 145 and circuit board 130. Flex conductor 150 may be a single, double, or multi-layer flexible printed circuit including a polyamide, PEEK, polyester, having printed or laminated conductive elements, for example. Such construction provides robust electrical characteristics that can provide reliable connection between various components while having a low bending radius to facilitate compact arrangement of flex conductor 150 within electronic device 100.

Battery 120 is positioned within electronic device housing 110. In some embodiments, battery 120 is positioned substantially centrally and/or towards a bottom region of electronic device housing 110 that may promote a user's perception of stability when electronic device 100 is handled. For example, battery 120 may be positioned adjacent to first, second, and/or third circuit boards 130a, 130b, 130c such that battery 120 is positioned substantially centrally between top and bottom sidewalls 111, 113. In other embodiments, battery 120 may be positioned in a stacked configuration such that circuit boards 130a and/or 130b are between battery 120 and display assembly 140 (e.g., sandwiched between battery 120 and display assembly 140), or vice versa.

Battery 120 provides a primary source of power for electronic device 100 and its components. Battery 120 may include a secondary cell, rechargeable battery configured for use through thousands of battery charging cycles over the entire useful life of electronic device 100, for example. In various embodiments, battery 120 may be a lithium polymer battery, lithium ion battery, nickel metal hydride battery, nickel cadmium battery, or other battery type configured to power electronic device 100 over many charging cycles. Alternatively or additionally, battery 120 may include a primary cell battery configured to be replaced when substantially discharged.

Battery 120 is shaped to provide a desired power capacity in a space-efficient configuration. In some embodiments, battery 120 has front and back major planar faces 121, 122 separated by minor sides 123, 124, 125, 126 defining a thickness ($t_{thickness}$) of battery 120. For example, sides 123, 125, may be parallel with top and bottom sidewalls 111, 113 of electronic device housing 110, and extend substantially across a width of electronic device housing 110, such as more than 50%, more than 75%, or more than 90% of the width of electronic device housing. Such a configuration promotes a relatively high power capacity for a battery having a particular power density.

Circuit board 130 is configured to accommodate components of electronic device 100 in a space-efficient manner, and provide robust mechanical and electrical connections between these components. Circuit board 130 may support and/or electrically connect one or more components of electronic device 100 such as one or more of battery 120, display 140, camera module 170, microphone 133, speaker 134, sensors 135, flash devices 137, processor 138, electrical connectors (e.g., USB connectors, audio connectors, etc.), antenna lines, and/or other components. In some embodiments, circuit board 130 includes first circuit board 130a positioned at a top region of electronic device housing 110, second circuit board 130b positioned at a bottom region of electronic device housing 110. Third circuit board 130c connects the first and second circuit boards 130a, 130b. First, second, and third, circuit boards 130a, 130b may be separately formed circuit boards and may be electrically connected by an electrical conductor. In other embodiments, first and second circuit boards 130a, 130b are integrally formed as a unitary circuit board with third circuit board 130c extending between first and second circuit boards 130a, 130b. First, second, and/or third circuit boards 130a, 130b, 130c may be printed circuit boards, flexible circuit boards, other circuit board types, and/or combinations thereof.

First and second circuit boards 130a, 130b may be positioned at top and bottom positions of electronic device housing 110 so that various components may be accommodated at top and bottom regions of the electronic device. For example, first circuit board 130a is positioned at a top region of electronic device housing 110 and may include components beneficially positioned at the top region. First circuit board 130a may accommodate components such as camera module 170, an earpiece assembly including a speaker, proximity sensor, antenna lines, a microphone configured to receive audio from the external environment that may be processed to provide noise cancellation, camera flash, diversity antenna, and/or other components. Second circuit board 130 is positioned at a bottom region of electronic device housing 110 and may include components beneficially positioned at the bottom region. Second circuit board may accommodate components such as an electrical connector (e.g., USB connectors, audio connectors, etc.), audio speaker, microphone to receive audio input from a user or the external environment, vibrator, and/or other components. Such positioning may promote functionality and usability of the components by a user of electronic device 100.

Third circuit board 130c may accommodate one or more other electrical components and/or electrically connect various components of first and second boards 130a, 130b. In some embodiments, third circuit board 130c includes one or more of a hall effects sensor, battery thermistor, magnetometer, or other electronic components. Third circuit board 130c may electrically connect processor 138, on first circuit board 130a, for example, with the components of second circuit board 130b. In some embodiments, circuit board 130c provides the only electrical connection between first and second circuit boards 130a, 130b. Electronic device 100 may not include a flex conductor, for example, extending over battery 120 between first and second circuit boards 130a, 130b, and may not include a flex conductor extending over battery 120 (e.g., between battery 120 and display assembly 140) at all.

Camera module 170 is mounted within electronic device housing 110 and configured to capture images and video. Camera module 170 may be aligned with one or more openings or transparent apertures 149 that allow transmission of light to camera module 170. For example, camera module 170 may be a front facing camera module 170 aligned with aperture 149 through front cover 141. Alternatively or additionally, electronic device 100 may include a rear facing camera module 170 aligned with an aperture through electronic device housing 110 (e.g., through back major planar face 115).

Camera module 170 is electrically connected with first, second, and/or third circuit boards 130a, 130b, 130c, including processor 138, such that control signals may be transmitted to camera module 170, and data captured by camera module 170 may be transmitted to processor 138 or other electronic components of electronic device 100. In some embodiments, camera module may be mounted directly to outer cover 141 or back major planar face 115 of electronic device housing 110, and electrically connected with circuit board 130, such as first circuit board 130a positioned at a top region of electronic device housing. In other embodiments, camera module 170 may be mounted on circuit board 130 and assembled within electronic device housing 110 with circuit board 130.

Figure 2:
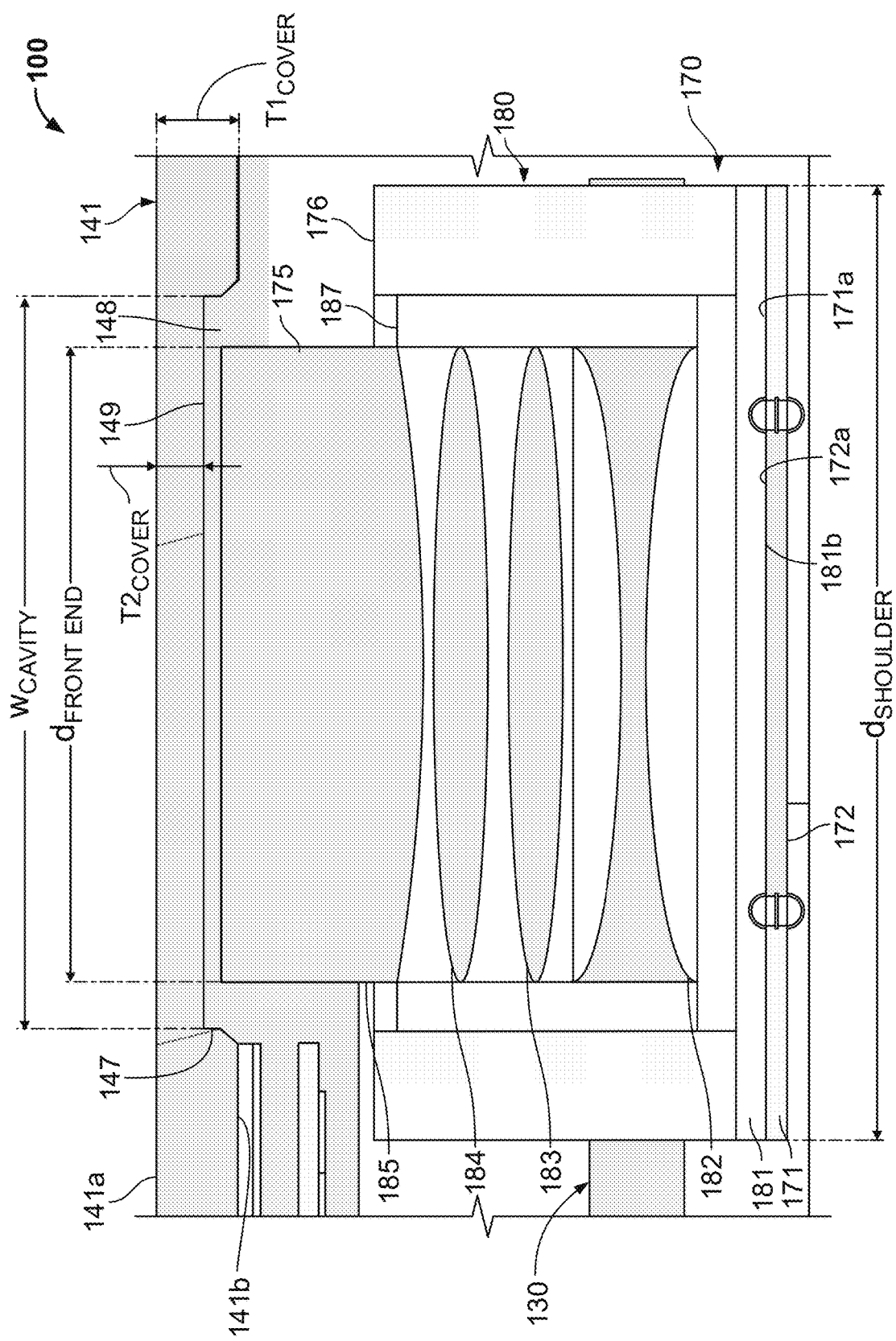
FIG. 2 is a cross-sectional view of the electronic device of FIG. 1.

Referring to FIG. 2, a cross-sectional view of electronic device 100 is shown, including camera module 170 positioned at least partially within cavity 148 defined by outer cover 141. Camera module 170 includes a circuit board 171, image sensor 172, and lens assembly 180. Lens assembly 180 includes one or more optical elements, such as first optical element 181, second optical element 182, third optical element 183, fourth optical element 184, and fifth optical element 185. Image sensor 172 captures light focused through lens assembly 180, and communicates associated image data to circuit board 171. In various embodiments, image sensor 172 may include a charged coupled device (CCD) image sensor, complementary metal-oxide-semiconductor (CMOS) image sensor, active pixel sensor (APS) image sensor, N-type metal-oxide-semiconductor (NMOS), combinations thereof, and/or other sensors.

Circuit board 171 may be integrally attached with circuit board 130 (e.g., circuit board 171 is a portion of circuit board 130). In other embodiments, circuit board 171 may be a circuit board primarily dedicated to camera module 170 that is formed separately from circuit board 130 and subsequently electrically connected with circuit board 130 during manufacture of electronic device 100. In various embodiments, circuit board 171 may be a printed circuit board, flexible circuit, other circuit board type, and/or combinations thereof.

Electronic device 100 and camera module 170 are configured to provide a space-efficient arrangement such that camera module 170 occupies a relatively small volume within electronic device 100. In some embodiments, at least a portion of camera module is positioned within cavity 148 defined by outer cover 141. A full thickness of camera module 170 and outer cover 141 do not each independently add to the overall thickness of electronic device 100. Such an arrangement can thus facilitate a reduced overall thickness of electronic device 100, and/or larger or additional components of camera module 170 that can facilitate improved image quality and performance.

In some embodiments, outer cover 141 includes a first thickness ($T1_{cover}$) and a second thickness ($T2_{cover}$). Outer cover 141 has the first thickness ($T1_{cover}$) throughout a majority of the outer cover, and may be present over a visible portion of the user interface display. In some embodiments, second thickness ($T2_{cover}$) is less than first thickness ($T1_{cover}$) and may be present at a location of cavity 148. For example, outer cover 141 may have an area of reduced thickness that defines cavity 148. A reduced thickness of cover 141 provides a space that can at least partially accommodate camera module 170.

Cavity 148 is defined on an inner face 141b of outer cover 141. Cavity 148 may be milled, molded, or otherwise formed to provide cavity 148 having a reduced second thickness ($T2_{cover}$). In some embodiments, outer cover 141 is initially formed having a consistent thickness (e.g., first thickness ($T1_{cover}$)) and subsequently milled to define cavity 148 having an area of reduced thickness (e.g., second thickness ($T2_{cover}$)). In various other embodiments, outer cover 141 may be etched, molded, or otherwise formed to provide outer cover 141 having an area of reduced thickness defining cavity 148.

An outer face 141a of outer cover 141 is substantially planar and free from junctions or seams proximate aperture 149. Outer cover 141 has a continuous, smooth surface proximate aperture 149 (e.g., without visible or tactile junction lines, seams, etc.), and a single, unitary substrate forms the outer cover 141 at aperture 149 and locations surrounding aperture 149. In some embodiments, outer cover 141 and camera module 170 are constructed and assembled such that electronic device 100 does not include any ribs or raised features proximate aperture 149. A continuous outer face 141a provided by a unitary outer cover 141 prevents environmental contaminants, such as water, dust, or other debris, from entering electronic device 100 at aperture 149. Alternatively or additionally, a continuous outer face 141a may promote an aesthetically pleasing appearance that may be free from seams or other features that otherwise signal the presence of aperture 149 and/or camera module 170 below outer cover 141.

Outer cover 141 has a thickness that provides a robust and durable cover of electronic device 100 and/or that allows components of display 142 to be viewed through outer cover 141. In some embodiments, outer cover has a thickness between 0.2 mm and 2.0 mm, 0.4 mm and 1.5 mm, 0.5 mm and 0.8 mm, or about 0.6 mm. For example, first thickness ($T1_{cover}$) may be between 0.2 mm and 2.0 mm, 0.4 mm and 1.5 mm, 0.5 mm and 0.8 mm, or about 0.6 mm over substantially the entire outer cover 141 (e.g., the entire outer cover except aperture 149 and/or other features of outer cover 141). Outer cover 141 may have a second thickness ($T2_{cover}$) that is less than first thickness ($T1_{cover}$) at the location of aperture 149. In various embodiments, second thickness is between 20% and 80%, 40% and 60%, or about 50% of first thickness ($T1_{cover}$). For example, second thickness ($T2_{cover}$) may be between 0.1 mm and 1.0 mm, between 0.2 mm and 0.6 mm, or about 0.3 mm. Such material thicknesses of outer cover 141 provide a robust and durable outer cover 141 while defining cavity 148 that may at least partially accommodate camera module 170. In some embodiments, such thicknesses allow inner face 141b of outer cover 141 to be milled consistently and efficiently without excessive breakage.

Inner face 141b of outer cover 141 may include a step or transition feature 147 proximate cavity 148 (e.g., between locations of first thickness ($T1_{cover}$) and second thickness ($T2_{cover}$). Step 147 may include an edge feature, such as a chamfered or beveled edge. Edge features can improve the durability of outer cover 141 by reducing sharp edges that can be a potential starting point for crack formation. Cavity 148 includes a width ($W_{cavity}$) between opposite steps 147 (e.g., opposite sides of cavity 148). Cavity 148 may be circular in shape and steps 147 may be a single step 147 that encircles cavity 148. Width is at least as large as ($W_{cavity}$) a width of a front end 175 of camera module 170 such that camera module 170 may be at least partially positioned within cavity 148. For example, width ($W_{cavity}$) may serve as a locating feature that appropriately positions camera module 170 during assembly, and/or may be similar (e.g. within +/−10%) to the width of front end 175. In some embodiments, width ($W_{cavity}$) may be selected to provide a desired tolerance to facilitate assembly of camera module 170 at least partially within cavity 148.

Camera module 170 may be configured to provide a space-efficient module that can fit in a relatively small space within electronic device 100 while capturing high optical quality images. Camera module 170 has a lens assembly 180 including a plurality of optical elements that facilitate capture of high-quality images by image sensor 172. Lens assembly 180 includes one or more optical elements housed within barrel 187, such as second, third, fourth, and fifth optical elements 182, 183, 184, 185. One or more of optical elements 182, 183, 184, 185 may be shaped to provide a desired optical power. For example, optical elements 182, 183, 184, 185 may have surfaces that are planar, concave, convex, and/or aspheric in shape. In some embodiments, optical elements 182, 183, 184, 185 each have surfaces that differ in shape. Alternatively or additionally, optical elements 182, 183, 184, 185 may have same thickness. One or more of optical elements 181, 182, 183, 184, 185 may be a filtering element, such as an infrared cutoff filter. Alternatively or additionally, one or more optical elements 181, 182, 183, 184, 185 may include an infrared filter coating or layer.

First optical element 181 may be positioned between image sensor 172 and second optical element 182, and may be within lens barrel 187 or outside of lens barrel 187. In some embodiments, image sensor 172 may be directly attached to first optical element 181. For example, front face 172a of image sensor 172 may be directly bonded to first optical element 181 by an adhesive, such as an optically transparent adhesive, welds, or otherwise attached while allowing light to be transmitted to image sensor 172 without excessive distortion and/or adhesive may be present only at a periphery location of image sensor 172. Alternatively or additionally, front face 171a of circuit board 171 may be directly attached to rear face 181b of first optical element 181 (e.g., directly bonded by an adhesive, welds, etc.). Front face 171a of circuit board 171 and front face 172a of image sensor 172 may thus each be mechanically attached to a common optical element (e.g., a rear face of first optical element 181). In various example embodiments, first optical element 181 may be made of one or more different materials, such as a first material of glass, polymer, or other material having desired optical characteristics at locations in front of image sensor 172, and a second material different than the first material at least partially at locations in front of circuit board 171. Image sensor 172 may be at least partially attached to the first and/or second material of optical element 181 (e.g. such as the first material), and circuit board 171 may be at least partially attached to the first and/or second material of optical element 181 (e.g. such as the second material).

Image sensor 172 is supported via attachment on front face 172a, which can eliminate the need for, or reduce the thickness of, one or more support components attached to a rear face of circuit board 171 and/or image sensor 172. Further, first optical element 181 simultaneously provides optical benefits while providing structural support to image sensor 172. In this way, image sensor 172 is supported by camera module 170 in a compact configuration having a reduced thickness (e.g., compared to some configurations having an additional structural support attached to a rear of image sensor 172).

Lens barrel 187 and/or one or more optical elements 181, 182, 183, 184, 185 may be movable relative to image sensor 172 along an optical path to adjust the optical focus of an object onto image sensor 172. For example, lens assembly may include a micro-electro-mechanical system (MEMS) actuator configured to move one or more lenses of lens assembly 180 along an optical axis (e.g., closer or further from front face 172a of image sensor 172). In other embodiments, camera module 170 may include a voice coil motor (VCM), a piezo actuator, other actuators, and/or combinations thereof, to move one or more optical elements relative to image sensor 172. First, second, third, fourth, and/or fifth optical elements 182, 183, 184, 185 may thus move relative to image sensor 172.

In some embodiments, camera module 170 includes a front end 175 at least partially surrounded by shoulder 176. Front end 175 has an outer diameter ($d_{front\ end}$) less than an outer diameter ($d_{shoulder}$) of shoulder 176. At least a portion of front end 175 is positioned within cavity 148, while shoulder 176 and portions of camera module 170 below shoulder 176 are not positioned within cavity 148. For example, the width ($W_{cavity}$) of cavity 148 may be between the diameter ($d_{front\ end}$) of front end 175 and the diameter ($d_{shoulder}$) of shoulder 176 such that width ($W_{cavity}$) is larger than diameter ($d_{front\ end}$) of front end 175 and smaller than diameter ($d_{shoulder}$) of shoulder 176. Such relative dimensions allow front end 175 to be positioned at least partially within cavity 148 (e.g. such that front end 175 extends towards the outer face 141a beyond inner face 141b of outer cover 141 and front end 175 is surrounded by outer cover 141), to cause a portion of front end 175 to be surrounded by outer cover 141, and/or to allow attachment of shoulder 176 to a component of electronic device 100. In some embodiments, shoulder 176 may be attached to inner face 141b of outer cover 141, directly or indirectly, to at least partially support camera module 170 within electronic device 100.

Figure 3:
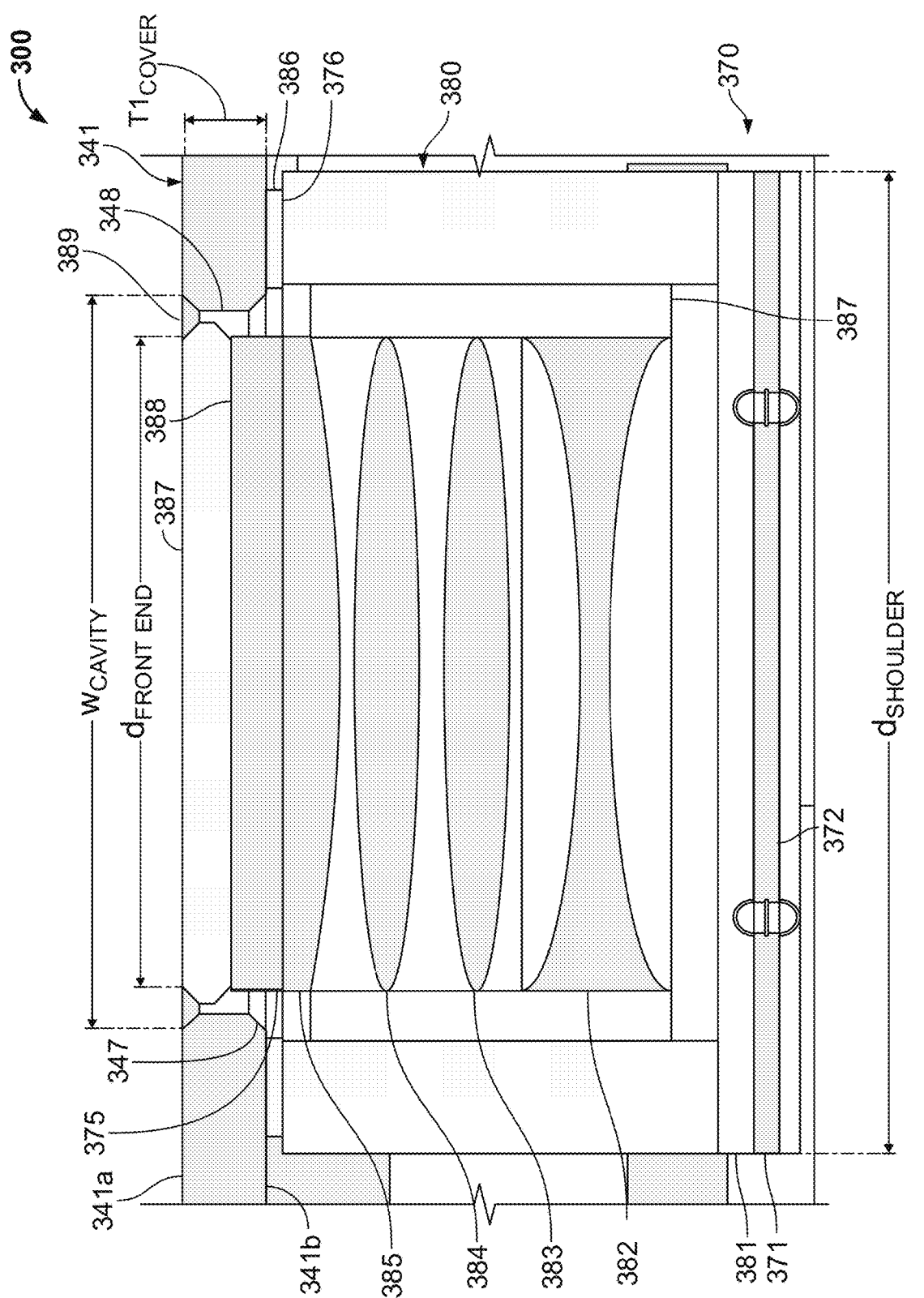
FIG. 3 is a cross-sectional view of another example electronic device.

Referring to FIG. 3, a cross-sectional view of electronic device 300 is shown, including camera module 370 positioned at least partially within cavity 348 defined by outer cover 341. In some embodiments, electronic device 300 and camera module 370 may have features similar to electronic device 100 and camera module 170 described above. Camera module 370 includes a circuit board 371, image sensor 372, and lens assembly 380. Lens assembly 380 includes one or more optical elements, such as first optical element 381, second optical element 382, third optical element 383, and fourth optical element 384. Image sensor 372 captures light focused through lens assembly 380, and communicates associated image data to circuit board 371.

Electronic device 300 and camera module 370 are configured to provide a space-efficient arrangement such that camera module 370 occupies a relatively small volume within electronic device 300. In some embodiments, at least a portion of camera module is positioned within cavity 348 defined by outer cover 341. A full thickness of camera module 370 and outer cover 341 do not each independently add to the overall thickness of electronic device 300. Such an arrangement can thus facilitate a reduced overall thickness of electronic device 300, and/or larger or additional components of camera module 370 that can facilitate improved image quality and performance.

In some embodiments, outer cover 341 includes a through-cut that defines a cavity 348. For example, outer cover 341 has a thickness ($T1_{cover}$) throughout a majority of outer cover 341 (e.g., over a visible portion of the user interface display). Cavity 348 is defined by an opening through the entire thickness ($T1_{cover}$). Cavity 348 defined by cover 341 provides a space that can at least partially accommodate camera module 370 and/or one or more other optical components. Cavity 348 may be milled, molded, or otherwise formed to provide cavity 348 extending through thickness ($T1_{cover}$) of outer cover 341. In some embodiments, outer cover 341 is initially formed having a consistent thickness (e.g., thickness ($T1_{cover}$)) and subsequently drilled or milled to define cavity 348. In various other embodiments, outer cover 341 may be etched, molded, or otherwise formed to provide outer cover 341 having a through-hole defining cavity 348.

Outer cover 341 has a thickness that provides a robust and durable cover of electronic device 300 and/or that allows components of a user interface display to be viewed through outer cover 341. In some embodiments, outer cover has a thickness between 0.2 mm and 2.0 mm, 0.4 mm and 1.5 mm, 0.5 mm and 0.8 mm, or about 0.6 mm. For example, thickness ($T1_{cover}$) may be between 0.2 mm and 2.0 mm, 0.4 mm and 1.5 mm, 0.5 mm and 0.8 mm, or about 0.6 mm over substantially the entire outer cover 341 (e.g. the entire outer cover except cavity 348 and/or other features of outer cover 341).

Electronic device 300 includes a cover lens 387 positioned at least partially within cavity 348 over lens barrel 385 of camera module 370. Cover lens 387 may provide the outermost lens of camera module 370, and/or provide protection to portions of camera module 370 below cover lens 387. In some embodiments, camera module 370 includes cover lens 387, and the camera module including cover lens 387 are together assembled with outer cover 341 and/or other portions of electronic device together with camera module 370. For example, cover lens 387 is first assembled with other components of camera module 370, and the entire camera module 370 is then installed within electronic device 300. Cover lens 387 may be directly attached to front end 375 of camera module 370. An adhesive layer 388 may be positioned between front end 375 and cover lens 375 that provides a bond between front end 375 and cover lens 387. In other embodiments, cover lens 387 may be mounted to outer cover 341 separate from camera module 370 and/or subsequently bonded to camera module 370.

An outer face 341a of outer cover 341 may be substantially planar proximate aperture 349 and cavity 348. In some embodiments, outer cover 341 and camera module 370 are constructed and assembled such that electronic device 300 does not include any ribs or raised features proximate aperture 349. A continuous outer face 141a reduces crevices or small areas where environmental contaminants, such as water, dust, or other debris, can collect and/or enter electronic device 300 proximate aperture 349. Alternatively or additionally, a continuous outer face 341a may promote an aesthetically pleasing appearance. In some embodiments, a seal 389, such as an adhesive, elastomeric gasket, or other seal is positioned at least partially in a space between cover lens 387 and outer cover 341. Seal 389 promotes a consistent, planar outer face 341 and prevents entry of environmental contaminants.

Outer cover 341 may include a step or transition feature 347 proximate cavity 348 (e.g., at edges defining cavity 348). Step 347 may include an edge feature, such as a chamfered or beveled edge. Edge features can improve the durability of outer cover 341 by reducing sharp edges that can be a potential starting point for crack formation. Cavity 348 includes a width ($W_{cavity}$) between opposite steps 347 (e.g. opposite sides of cavity 348). Width ($W_{cavity}$) is at least as large as a width of a front end 375 of camera module 370 such that camera module 370 may be at least partially positioned within cavity 348.

In some embodiments, front end 375 of camera module 370 is at least partially surrounded by shoulder 376. Front end 375 has an outer diameter ($d_{front\ end}$) less than an outer diameter ($d_{shoulder}$) of shoulder 376. At least a portion of front end 375 is positioned within cavity 348, while shoulder 376 and portions of camera module 370 below shoulder 376 are not positioned within cavity 348. For example, the width ($W_{cavity}$) of cavity 349 may be between the diameter ($d_{front\ end}$) of front end 375 and the diameter ($d_{shoulder}$) of shoulder 376 such that width ($W_{cavity}$) is larger than diameter ($d_{front\ end}$) of front end 375 and smaller than diameter ($d_{shoulder}$) of shoulder 376. Such relative dimensions allow front end 375 to be positioned at least partially within cavity 349 and/or allow attachment of shoulder 376 to a component of electronic device 300.

In some embodiments, shoulder 376 is attached to inner face 341b of outer cover 341, directly or indirectly. For example, camera module 370 may be sealed to inner face 341b of outer cover 341. Sealed engagement prevents ingress of environmental contaminants into electronic device 300, and/or at least partially supports camera module 370 within electronic device 300. A seal 386 may be positioned between shoulder 376 and inner face 341b of outer cover 341 to promote sealing engagement. Seal 386 may be a gasket, O-ring, compressible seal, or other seal that promotes sealing engagement between shoulder 376 and inner face 341b. Alternatively or additionally, seal 386 may include an adhesive applied between shoulder 376 and inner face 341b. Direct, sealing engagement between camera module 370 and outer cover 341 provides a space-efficient arrangement while providing a robust sealing engagement to prevent entry of foreign contaminants.

Figure 4:
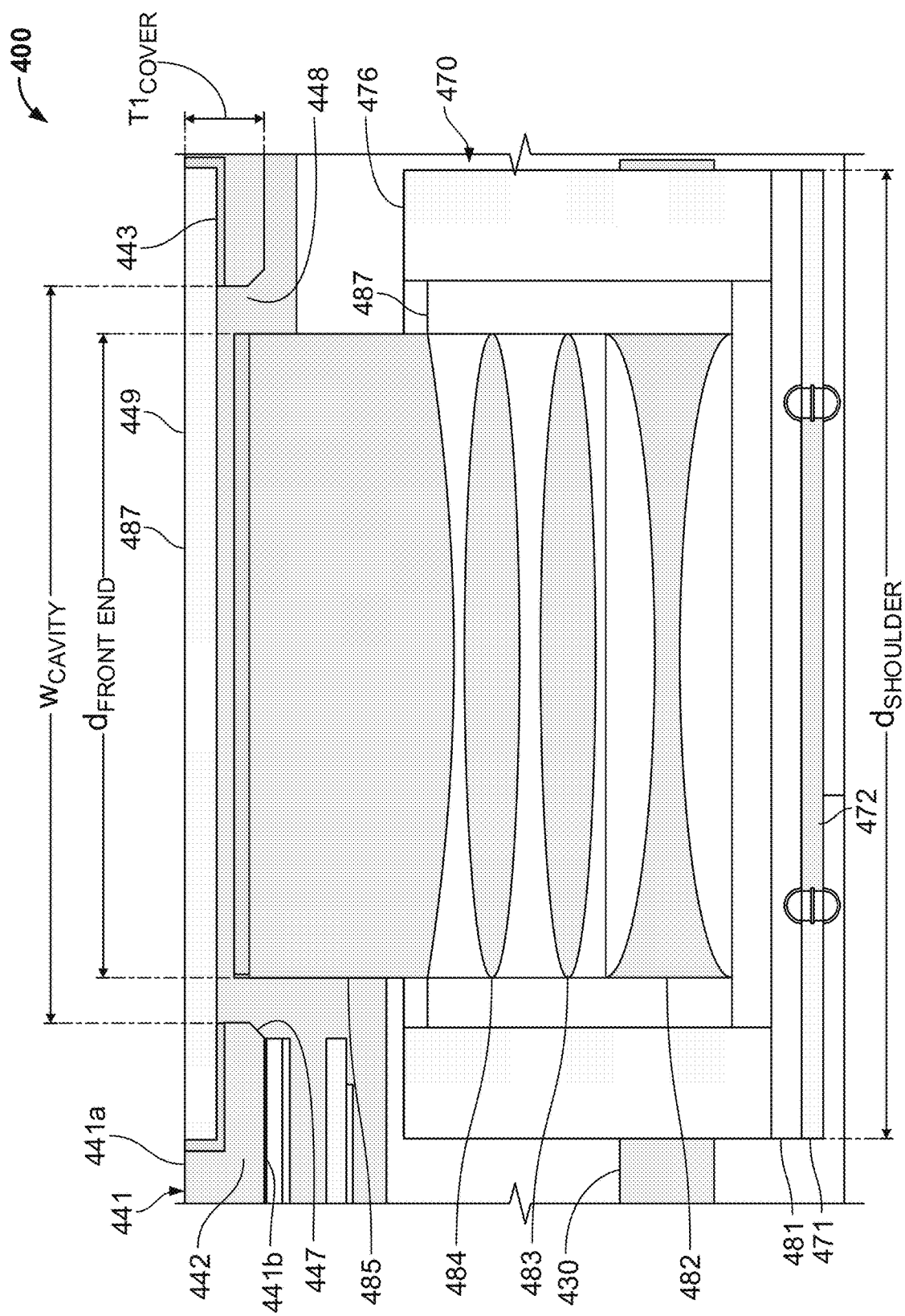
FIG. 4 is a cross-sectional view of another example electronic device.

Referring to FIG. 4, a cross-sectional view of electronic device 400 is shown, including camera module 470 positioned at least partially within cavity 448 defined by outer cover 441. In some embodiments, electronic device 400 and camera module 470 may have features similar to electronic device 300 and camera module 370 described above. Camera module 470 includes a circuit board 471, image sensor 472, and lens assembly 480. Lens assembly 480 includes one or more optical elements, such as first optical element 481, second optical element 482, third optical element 483, and fourth optical element 484. Image sensor 472 captures light focused through lens assembly 480, and communicates associated image data to circuit board 471.

Electronic device 400 and camera module 470 are configured to provide a space-efficient arrangement such that camera module 470 occupies a relatively small volume within electronic device 400. In some embodiments, at least a portion of camera module is positioned within cavity 448 defined by outer cover 441. A full thickness of camera module 470 and outer cover 441 do not each independently add to the overall thickness of electronic device 400. Such an arrangement can thus facilitate a reduced overall thickness of electronic device 400, and/or larger or additional components of camera module 470 that can facilitate improved image quality and performance.

In some embodiments, outer cover 441 includes a through-cut that defines cavity 448. For example, outer cover 441 has a thickness ($T1_{cover}$) throughout a majority of outer cover 441 (e.g. over a visible portion of the user interface display). Cavity 448 is defined by an opening through the entire thickness ($T1_{cover}$). Cavity 448 defined by cover 441 provides a space that can at least partially accommodate camera module 470 and/or one or more other optical components. Cavity 448 may be milled, molded, or otherwise formed to provide cavity 448 extending through thickness ($T1_{cover}$) of outer cover 441. In some embodiments, outer cover 441 is initially formed having a consistent thickness (e.g. thickness ($T1_{cover}$)) and subsequently drilled or milled to define cavity 448. In various other embodiments, outer cover 341 may be etched, molded, or otherwise formed to provide outer cover 441 having an area of reduced thickness defining cavity 448.

Outer cover 441 has a thickness that provides a robust and durable cover of electronic device 400 and/or that allows components of a user interface display to be viewed through outer cover 441. In some embodiments, outer cover has a thickness between 0.2 mm and 2.0 mm, 0.4 mm and 1.5 mm, 0.5 mm and 0.8 mm, or about 0.6 mm. For example, thickness ($T1_{cover}$) may be between 0.2 mm and 2.0 mm, 0.4 mm and 1.5 mm, 0.5 mm and 0.8 mm, or about 0.6 mm over substantially the entire outer cover 441 (e.g. the entire outer cover except cavity 448 and/or other features of outer cover 441).

Electronic device 400 includes a cover lens 487 positioned at least partially over cavity 448 and lens barrel 485 of camera module 470. Cover lens 487 may provide the outermost lens of camera module 470, and/or provide protection to portions of camera module 470 below cover lens 487. In some embodiments, outer cover 441 includes a shoulder 442 extending at least partially around a perimeter of cavity 448. Cover lens 487 is attached to an outer face 441a of outer cover 441 at shoulder 442. For example, cover lens 487 may be sealed to outer face 441a of outer cover 441 by seal 443 including an adhesive, O-ring, compressible seal, and/or other seal that promotes sealing engagement between cover lens 487 and shoulder 442. Further, shoulder 442 may facilitate manufacturing and assembly by providing a cavity and consistent surface that can receive cover lens 487.

An outer face 441a of outer cover 441 may be substantially planar proximate aperture 449 and cavity 448. In some embodiments, outer cover 441 and camera module 470 are constructed and assembled such that electronic device 400 does not include any ribs or raised features proximate aperture 449. For example, outer face 441a may be substantially planar between over cover lens 487 and outer cover 441. A continuous outer face 441a reduces crevices or small areas where environmental contaminants, such as water, dust, or other debris, can collect and/or enter electronic device 400 proximate aperture 449. Alternatively or additionally, a continuous outer face 441a may promote an aesthetically pleasing appearance.

Outer cover 441 may include a step or transition feature 447 proximate cavity 448 (e.g., at edges of shoulder 442 defining cavity 448). Step 447 may include an edge feature, such as a chamfered or beveled edge. Edge features can improve the durability of outer cover 441 by reducing sharp edges that can be a potential starting point for crack formation. Cavity 448 includes a width ($W_{cavity}$) between opposite steps 447 (e.g. opposite sides of cavity 448). Width ($W_{cavity}$) is at least as large as a width of a front end 475 of camera module 470 such that camera module 470 may be at least partially positioned within cavity 448.

In some embodiments, front end 475 of camera module 470 is at least partially surrounded by shoulder 476. Front end 475 has an outer diameter ($d_{front\ end}$) less than an outer diameter ($d_{shoulder}$) of shoulder 476. At least a portion of front end 475 is positioned within cavity 448, while shoulder 476 and portions of camera module 470 below shoulder 476 are not positioned within cavity 448. For example, the width ($W_{cavity}$) of cavity 449 may be between the diameter ($d_{front\ end}$) of front end 475 and the diameter ($d_{shoulder}$) of shoulder 476 such that width ($W_{cavity}$) is larger than diameter ($d_{front\ end}$) of front end 475 and smaller than diameter ($d_{shoulder}$) of shoulder 476. Such relative dimensions allow front end 475 to be positioned at least partially within cavity 449 and/or allow attachment of shoulder 476 to a component of electronic device 400.

In some embodiments, shoulder 476 is attached to inner face 441b of outer cover 441, directly or indirectly. Alternatively or additionally, camera module 470 may be supported on circuit board 430, for example.

Figure 5:
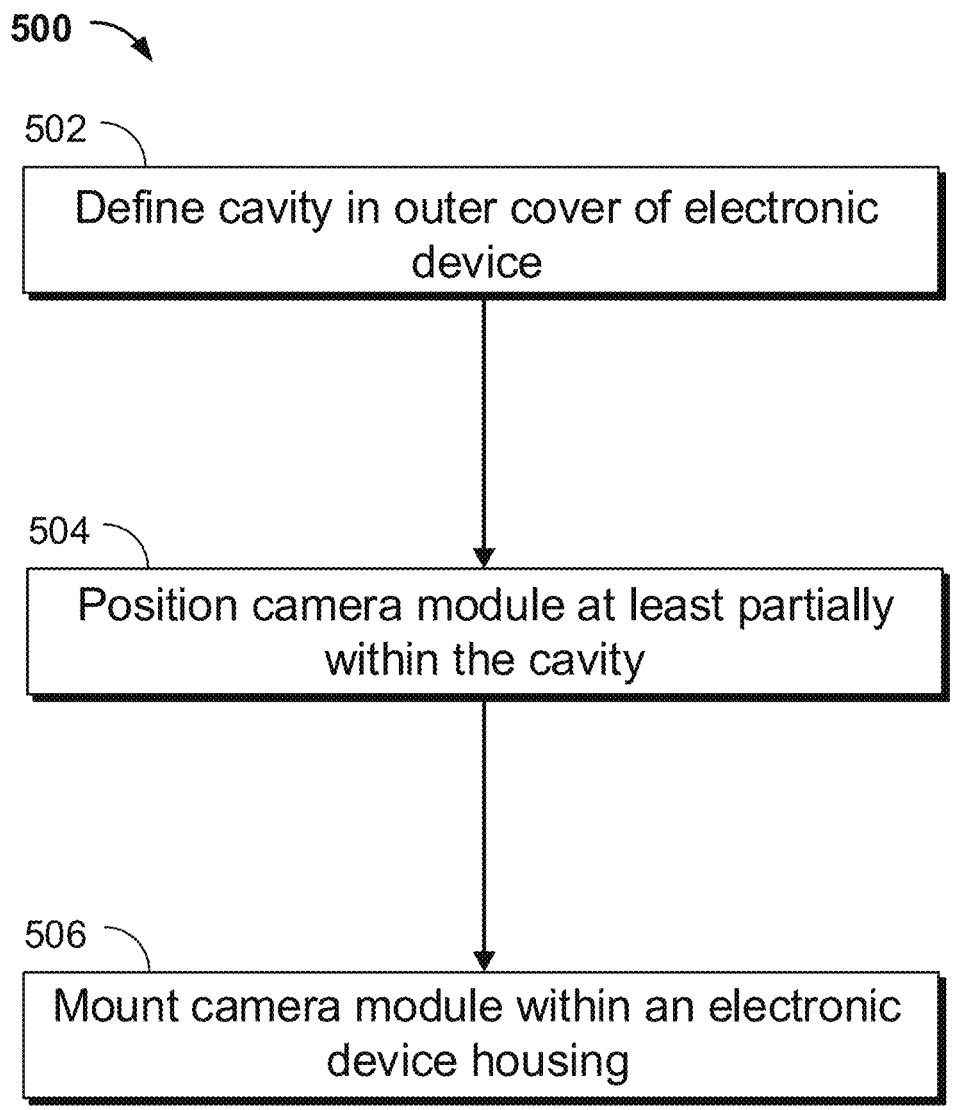
FIG. 5 is a flow diagram of an example method of manufacturing an electronic device that includes a camera module.

Referring to FIG. 5, a flow diagram of an example method 500 of mounting a camera module is shown, including positioning a camera module at least partially within a cavity of an outer cover of an electric device. In some embodiments, method 500 includes operation 502 of defining a cavity in an outer cover of an electronic device. For example, operation 502 may include milling, molding, cutting or otherwise forming a cavity in the outer cover. The cavity may define an area of reduced thickness, such that the outer cover is relatively thinner at the location of the cavity as opposed to surrounding locations. In some embodiments, operation 502 may include forming a cavity that extends through the entire thickness of the outer cover. Alternatively or additionally, operation 502 may including forming a shoulder or ledge at least partially surrounding the cavity. The shoulder or ledge may be configured for attachment with a cover lens and/or features of the camera module.

Method 500 further includes operation 504 of positioning the camera module at least partially within the cavity defined by the outer cover. For example, a front region of a camera module may be positioned at least partially within the cavity such that total thickness of the outer cover and the camera module do not each independently add to the overall thickness of the electronic device. In some embodiments, the cavity has a width that is greater than a diameter of a front end of the camera module, and operation 504 includes positioning a front end of the camera module at least partially within the cavity.

Method 500 further includes operation 506 of mounting the camera module within the electronic device housing. In some embodiments, the camera module is mounted to a circuit board within the electronic device housing and positioned in alignment with an aperture through the electronic device housing. For example, the camera module may be electrically connected with the circuit board and positioned in alignment with an aperture through a front cover of the electronic device such that the camera module is configured as a front-facing camera. In other embodiments, camera module may be positioned in alignment with an aperture through a rear cover of the electronic device (e.g., on an opposite side of the electronic device from a main user display) such that the camera module is configured as a rear-facing camera. Alternatively or additionally, operation 506 may include mounting the camera module to the outer cover. For example, camera module may be sealingly engaged with the outer cover. Sealing engagement prevents ingress of environmental contaminants into the electronic device, and/or at least partially supports the camera module within electronic device 300. Operation 506 may include positioning a seal between a shoulder of the camera module and an inner face of the outer cover. The seal may be a gasket, O-ring, compressible seal, or other seal that promotes sealing engagement between the camera module and outer cover.

Operations 502, 504, 506 may be performed in any suitable order. In some embodiments, the cavity is defined in the outer cover during an initial manufacturing step of manufacturing the outer cover, followed by assembly with the camera module and mounting within an electronic device housing. In other embodiments, the camera module is mounted within the electronic device housing, and is subsequently enclosed by attaching the outer cover to a component of the electronic device housing such that the camera module is positioned at least partially within the cavity.

While this specification contains many specific implementation details, these should not be construed as limitations on the scope of any disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. An electronic device, comprising:
    a device cover that defines a cavity and has an interior sidewall that surrounds the cavity; and
    a camera module including an image sensor, a first optical element, and a second optical element, the camera module being positioned partially within the cavity defined by the device cover, such that the interior sidewall of the device cover faces a portion of the camera module that is positioned within the cavity,
    wherein the electronic device includes transparent material in front of the camera module along an optical axis of the camera module such that an exterior surface of the transparent material defines part of an exterior surface of the electronic device, the exterior surface of the transparent material that is in front of the camera module along the optical axis being surrounded by and coplanar with an exterior surface of a portion of the device cover that that surrounds the optical axis,
    the transparent material being a portion of the device cover that is aligned with the optical axis, such that the transparent material is integrally formed with a remainder of the device cover, the transparent material that is the portion of the device cover that is aligned with the optical axis having a first thickness along the optical axis, and the portion of the device cover that surrounds the optical axis having a second thickness in a same direction as the optical axis but offset from the optical axis, the second thickness being greater than the first thickness.

2. The electronic device of claim 1, wherein the electronic device includes a display assembly that comprises a multi-layer display panel that includes the device cover, a visible display layer, and a layer configured to detect touch input from a user.

3. The electronic device of claim 1, wherein the device cover occupies substantially all of a front major face of the electronic device, such that the front major face of the electronic device is coplanar with and includes the exterior surface of the transparent material in front of the camera module along the optical axis.

4. The electronic device of claim 1, further comprising a display integrated circuit and a flexible conductor that connects the display integrated circuit with a circuit board located behind the display integrated circuit.

5. The electronic device of claim 4, wherein the camera module is mounted to the circuit board.

6. The electronic device of claim 5, further comprising a processor that is mounted to the circuit board and a speaker that is mounted to the circuit board.

7. The electronic device of claim 1, wherein the camera module is not directly connected with the device cover.

8. The electronic device of claim 1, wherein the camera module comprises a voice coil motor and at least one optical element movable relative to the image sensor by actuation of the voice coil motor.

9. The electronic device of claim 1, wherein the camera module is mounted to an inner side of the device cover.

10. The electronic device of claim 1, further comprising a display device that is covered by the device cover on a front side of the display device that electronically presents visual content, such that the device cover both covers the display device and covers the camera module.

11. The electronic device of claim 10, wherein the camera module is surrounded by the display device that electronically presents visual content, such that the optical axis is located within an interior of the display device.

12. The electronic device of claim 1, wherein the portion of the camera module that is positioned within the cavity comprises a lens barrel of the camera module that is positioned partially within the cavity and partially outside of the cavity.

13. The electronic device of claim 1, wherein the interior sidewall is circular and encircles the cavity and the portion of the camera module that is positioned within the cavity.

14. The electronic device of claim 13, wherein:
the interior sidewall is spaced apart from the portion of the camera module that is positioned within the cavity by an air gap; and
the interior sidewall is immediately adjacent the portion of the camera module that is positioned within the cavity, such that only the air gap separates the interior sidewall from the portion of the camera module that is positioned within the cavity.

15. An electronic device, comprising:
a device cover that defines a cavity and has an interior sidewall that surrounds the cavity, the device cover being positioned in front of a visible display layer of an electronic display and a layer configured to detect touch input from a user;
a circuit board;
a camera module including an image sensor and a lens barrel including at least a first optical element, the camera module mounted to the circuit board;
a speaker mounted to the circuit board; and
a processor mounted to the circuit board;
wherein the camera module is positioned partially within the cavity defined by the device cover such that the interior sidewall of the device cover faces a portion of the lens barrel that is positioned within the cavity,
wherein the electronic device includes transparent material in front of the camera module along an optical axis of the camera module such that an exterior surface of the transparent material defines part of an exterior surface of the electronic device, the exterior surface of the transparent material that is in front of the camera module along the optical axis being surrounded by and coplanar with an exterior surface of a portion of the device cover that that surrounds the optical axis,
the transparent material being a portion of the device cover that is aligned with the optical axis, such that the transparent material is integrally formed with a remainder of the device cover, the transparent material that is the portion of the device cover that is aligned with the optical axis having a first thickness along the optical axis, and the portion of the device cover that surrounds the optical axis having a second thickness in a same direction as the optical axis but offset from the optical axis, the second thickness being greater than the first thickness.

16. An electronic device, comprising:
a device cover that defines a cavity and has an interior sidewall that surrounds the cavity; and
a camera module including an image sensor, a first optical element, and a second optical element, the camera module being positioned partially within the cavity defined by the device cover, such that the interior sidewall of the device cover faces a portion of the camera module that is positioned within the cavity,
wherein the electronic device includes transparent material in front of the camera module along an optical axis of the camera module such that an exterior surface of the transparent material defines part of an exterior surface of the electronic device, the exterior surface of the transparent material that is in front of the camera module along the optical axis being surrounded by and coplanar with an exterior surface of a portion of the device cover that that surrounds the optical axis,
the transparent material comprising a camera lens that is separate from the device cover, such that the portion of the device cover that surrounds the optical axis also surrounds the camera lens, and
an exterior surface of the camera lens is coplanar with the exterior surface of the portion of the device cover that surrounds the optical axis and the camera lens.

17. The electronic device of claim 16, wherein:
the camera lens is separated from the portion of the device cover that surrounds the optical axis and the camera lens by an air gap; and
the electronic device comprises a seal located in the air gap between the camera lens and the device cover.

18. The electronic device of claim 17, wherein an exterior surface of the seal is coplanar with the exterior surface of the camera lens and the exterior surface of the portion of the device cover that surrounds the optical axis and the camera lens.

19. The electronic device of claim 17, further comprising a display device that is covered on a front side of the display device that electronically presents visual content by the device cover.

20. The electronic device of claim 19, wherein:
the interior sidewall is spaced apart from the portion of the camera module that is positioned within the cavity by an air gap; and
the interior sidewall is immediately adjacent the portion of the camera module that is positioned within the cavity, such that only the air gap separates the interior sidewall from the portion of the camera module that is positioned within the cavity.

21. The electronic device of claim 16, wherein the interior sidewall is circular and encircles the cavity and the portion of the camera module that is positioned within the cavity.

* * * * *